Dec. 13, 1966  L. M. CARATAN ET AL  3,291,075
CAR LOAD
Filed Feb. 1, 1965 3 Sheets-Sheet 1
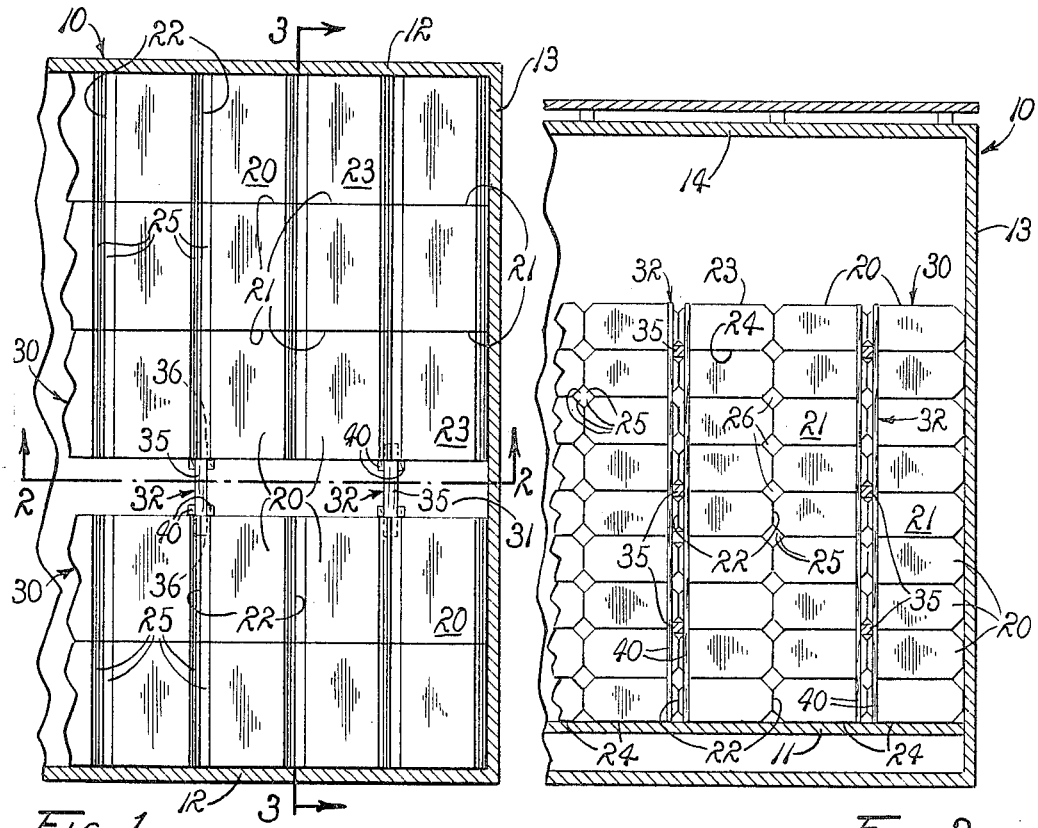
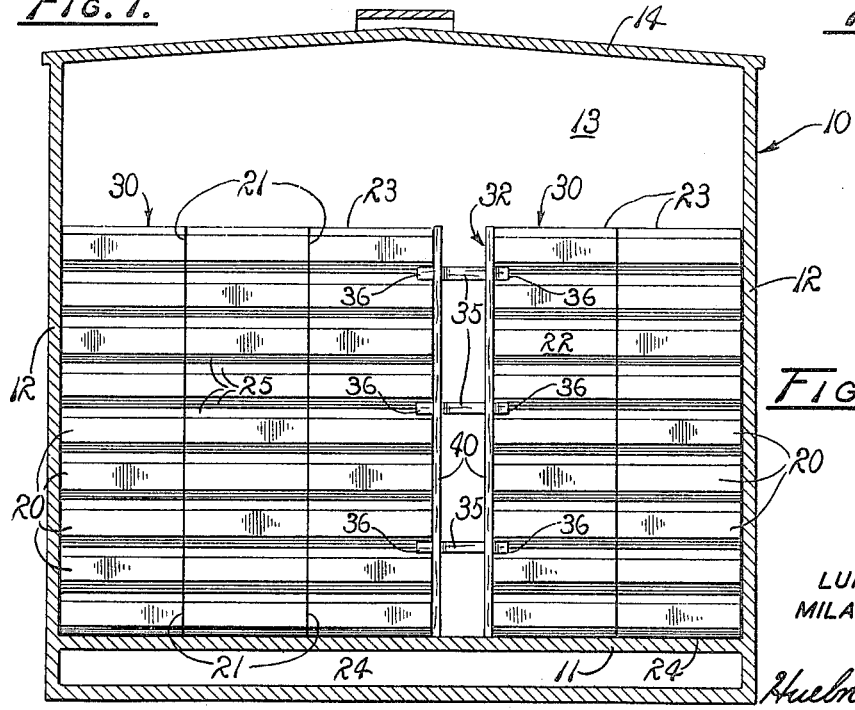
LUIS M. CARATAN
MILAN M. CARATAN
INVENTORS
Huebner & Worrel
ATTORNEYS

LUIS M. CARATAN
MILAN M. CARATAN
INVENTORS

Dec. 13, 1966     L. M. CARATAN ET AL     3,291,075
CAR LOAD
Filed Feb. 1, 1965     3 Sheets-Sheet 3
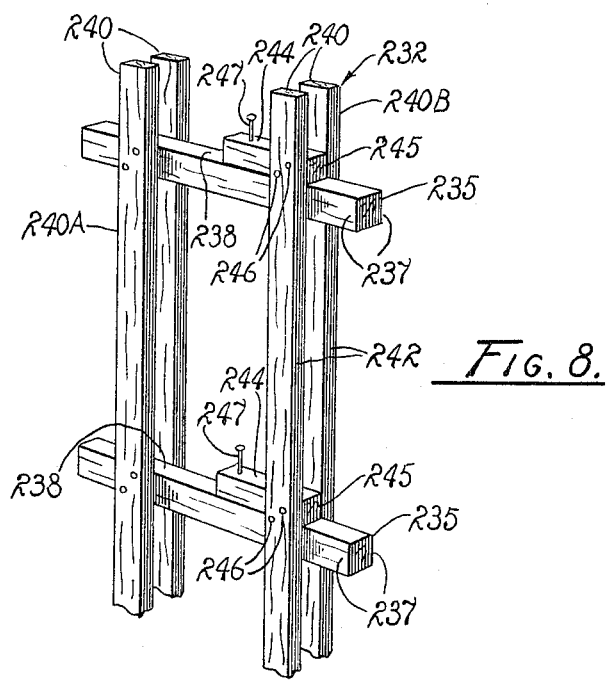
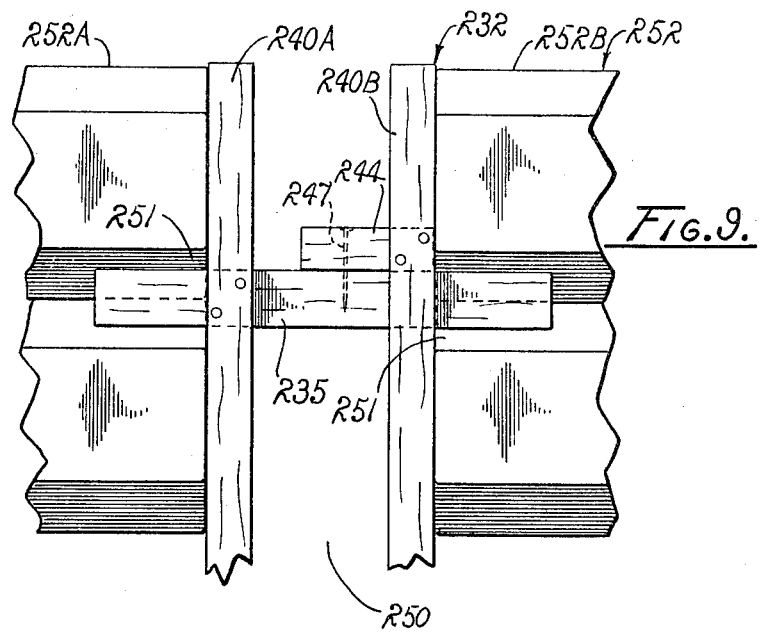
LUIS M. CARATAN
MILAN M. CARATAN
INVENTORS
Huebner & Worrel
ATTORNEYS

United States Patent Office 3,291,075
Patented Dec. 13, 1966

3,291,075
CAR LOAD
Luis M. Caratan, Rte. 2, Box 400, and Milan M. Caratan, Rte. 2, Box 255, both of Delano, Calif.
Filed Feb. 1, 1965, Ser. No. 432,066
12 Claims. (Cl. 105—369)

This is a continuation-in-part of application Serial No. 403,276, filed October 12, 1964, now abandoned. The present invention relates to an improved car load of a plurality of packing boxes, and particularly relates to a spacing member which cooperates with such boxes dependably to maintain their relative positions in a car load during transit.

A variety of apparatus and methods have been devised to prevent shifting of the individual boxes of a car load during movement of railroad cars containing such boxes. It is imperative that the boxes be maintained in a predetermined position to avoid damage to the contents, as well as to meet the requirements of shipping regulations and tariffs of governmental agencies.

In many previously known car load apparatus and methods, the railroad cars were pre-conditioned by nailing, or otherwise securing, wooden strips as spacing and load restraining members. In such car loads, the boxes were necessarily individually placed, and, in many of these car loads, additional restraining members were secured to the boxes and/or the railroad cars as the loading progressed. In addition to the material costs for the restraining strips, the number of workmen necessarily employed in the car loading method and installing such strips resulted in extremely high labor costs.

Heretofore, most apparatus used in maintaining a predetermined position of boxes in a car load precluded the use of mechanical aids in the actual loading. Consequently, in loading refrigerated railroad cars with perishable products, the direct labor costs were necessarily high in order to complete the loading in a minimum time period and avoid unnecessary heating of the previously cooled products.

Accordingly, it is an object of the present invention to provide an improved car load which permits greater mechanization in the art of box car loading.

Another object of the invention is to provide a car load having spacing members which dependably maintain the individual boxes in position in the load.

Another object is to provide a car load having such spacing members adapted for use in cars having wall variations.

Another object is to provide an improved car load which minimizes the costs of loading a plurality of boxes in railroad cars.

Another object is to provide an improved car load which eliminates the need for pre-conditioning box cars to receive the individual boxes which make up the car load.

A further object is to provide a car load which requires minimum structure to maintain the boxes in a predetermined shipping position, none of which structure is fastened to the car, thereby permitting more expeditious loading and unloading of the boxes.

These, together with other objects, will become more fully apparent upon reference to the following description and accompanying drawings.

In the drawings:

FIG. 1 is a fragmentary top plan view of a car load embodying the principles of the present invention, the load confining box car being fragmentarily shown in horizontal section for illustrative convenience.

FIG. 2 is a view in vertical, longitudinal section of the car load of FIG. 1 and taken on line 2—2 thereof.

FIG. 3 is a view in vertical, transverse section of the car load of FIG. 1 and taken in a plane represented by line 3—3 thereof.

FIG. 8 is a fragmentary perspective view of a modified form of spacing member.

FIG. 9 is an enlarged fragmentary view of a car load utilizing the modified spacing member of FIG. 8.

Figure 4:
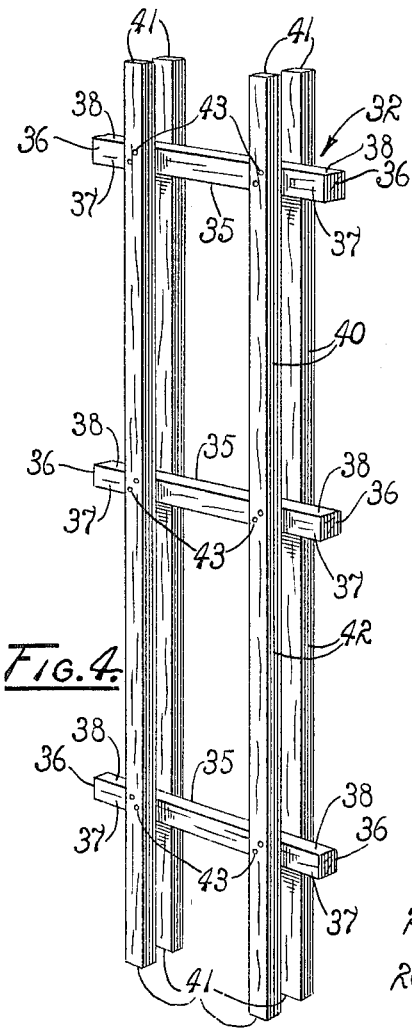
FIG. 4 is an enlarged perspective view of one of the spacing members employed in the car load of FIG. 1.

Referring more particularly to FIGS. 1, 2 and 3, a railroad box car is fragmentarily illustrated at 10 as representative of a load confining and supporting vehicle employed in shipment by conventional railroads. The car 10 provides a substantially horizontal floor 11, laterally opposed upright side walls 12 extended longitudinally of the car and interconnected by transversely extended end walls 13. As can be seen in FIG. 3, an enclosing top 14 provides an enclosure to receive a car load. Since the present invention has particular utility in the loading of produce normally shipped in refrigerated box cars, the specific embodiment illustrated herein will be described in such an environment.

Figure 5:
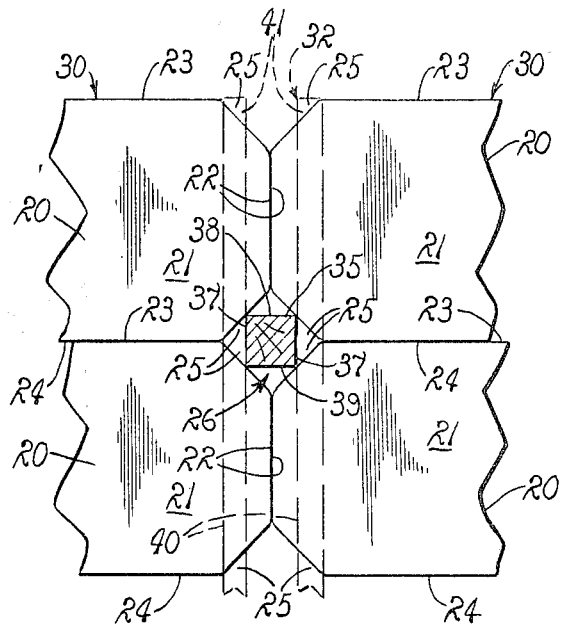
FIG. 5 is a fragmentary enlarged view of contiguous boxes employed in the car load of FIG. 2, the boxes being shown in end elevation.

A plurality of individual produce boxes 20 are each provided with opposite ends 21, laterally opposed sides 22 and enclosing tops and bottoms 23 and 24. The boxes are of substantially uniform shape, and the opposite ends are of substantially identical polygonal configuration, which, in certain forms of produce boxes, is other than rectangular. In many previous car loads, produce boxes, such as lug boxes employed in packing and shipping fresh fruit, were provided with opposed ends of rectangular configuration. Many contemporary lug boxes are now fabricated with opposed ends of a configuration, as illustrated in FIGS. 2 and 5, so as to provide spacing intervals or strut receiving chambers 25 at each end of a box adjacent the sides 22. As can be seen in FIG. 5, the spaces 25 of contiguous boxes form a hollow receiving chamber 26.

It is a conventional practice in loading box cars to arrange the boxes in stacks indicated at 30, and to arrange the stacks of boxes in rows extended longitudinally of the car and in tiers extended transversely thereof. The stacks 30 are arranged in a predetermined height to provide a sufficient number of layers of boxes to complete the car load. The transverse dimension of the box car 10 relative to a multiple of the lengthwise dimension of the boxes affords a spacing chamber or passage 31 between the ends of boxes in two adjacent stacks of each tier. Since there is some variation between individual box cars, this spacing distance varies between railroad cars selected for loading.

It will be appreciated by those skilled in the art of box car loading that certain variations occur between respective longitudinal dimensions of box cars, and that center gate bracing is employed between adjacent tiers near the center of the car to preclude longitudinal shifting of the individual boxes 20. Such center gate bracing is well-known in the art and the details of the structure will not be described, since it forms no part of the present invention. It is to be understood that it is normally employed in conventional car loads made up of a plurality of individual boxes.

Figure 7:
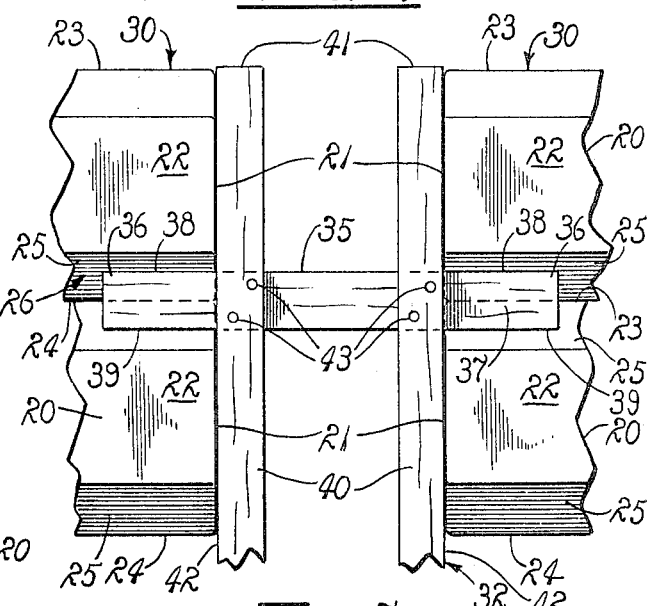
FIG. 7 is an enlarged fragmentary view of the car load of FIG. 3.

To prevent shifting of the individual boxes 20 transversely of the box car 10, a plurality of spacing members 32 are disposed in the car load within chamber 31 at selected intervals of spacing longitudinally of the car. Each of the spacing members 32 provides a plurality of struts 35 of sufficient length to bridge the spacing chamber 31 and extend into the chambers 26 formed by contiguous boxes 20 in adjacent rows. As can be seen in FIG. 7, each strut is provided with opposite ends 36, each of which is received in the chamber 26 formed by contiguous boxes of adjacent layers and tiers in each of the rows on opposite sides of the elongated chamber 31. Each of the struts 35 is of a predetermined thickness so as to be accommodated by the chambers 26 and affords opposed side faces 37 and top and bottom faces 38 and 39.

A plurality of elongated uprights 40 are each provided with opposite ends 41 and load engaging faces 42. The uprights 40 are rigidly secured to the struts 35 as by nails 43 in opposed paired relation in contact with the side faces 37 of each strut, the pairs being spaced longitudinally of each strut. When so secured to the struts, the uprights present their respective faces 42 in a position adapted to engage the individual boxes of adjacent rows defining the elongated chamber 31.

*Operation*

The operation of the described embodiment of the subject invention is believed to be readily apparent and is briefly summarized at this point. As stated above, the present invention has particular utility in preparing a car load of individual boxes in the shipment of fresh produce. As is a common practice in the art, such produce is packed and pre-cooled in suitable refrigerating chambers so as to reduce the heat load on the refrigerating system of the car 10. Consequently, it behooves the shipper to complete a car load in the minimum amount of time to prevent the produce from absorbing heat from the ambient air.

As is evident from the structure illustrated in FIGS. 1, 2, and 3, the box car 10 requires no pre-conditioning by positioning and securing of nailing strips, or other load restraining devices. The boxes 20 are normally maintained in the vertical stacks 30 in the refrigerated chamber, such as a warehouse, not shown. Accordingly, the boxes 20 are carried into the box car 10 in the multiple number of each stack, rather than by individual boxes, as in previous car loads. Since the aggregate weight of each stack of the boxes greatly exceeds that which an average person is capable of lifting, hand trucks, or other suitable machines, not shown, are employed in moving the stacks 30 from the packing house or refrigerated storage to the box car 10.

The stacks 30 are arranged in rows extending longitudinally of the car and in tiers extended transversely thereof, as illustrated in FIG. 1. As each alternately successive tier of rows is deposited in the car, a spacing member 32 is disposed in the chamber 31 in a position so that the opposite ends of each of the struts 35 are received in a respective chamber 26 formed by contiguous boxes in adjacent layers and tiers of the rows defining the chamber 31. It will be appreciated that the spacing member 32 is inserted before all of the stacks are deposited in these adjacent rows. As for example, in FIG. 1, those stacks indicated at 30A are deposited prior to the insertion of the spacing member 32. Subsequent to such insertion, the stack indicated at 30B is then deposited so as to complete the formation of the chambers 26 and maintain the spacing member in position.

The successive tiers of stacks are then deposited in the box car and additional spacing members 32 inserted in alternately successive tiers, so as to provide a number of such spacing members spaced longitudinally of the car 10. The remainder of the car load is completed by a conventional center gate bracing and squeezing means, previously referred to and not described in detail herein. With a car load so formed and with the spacing members 32 engaging the corners of the boxes in contiguous stacks of adjacent tiers on opposite sides of the spacing chamber 31, the individual boxes in each tier of stacks are dependably maintained in position and shifting of the boxes transversely of the car is positively precluded.

It is to be noted that the spacing members 32 do not require an individual strut to be disposed intermediate all of the adjacent layers of boxes in the stacks, but that the struts may be spaced at predetermined elevational levels. The weight of the boxes above the lowermost strut exerts a certain downward force upon the superposed boxes through the uprights 40 and struts at a higher elevational level. Stated differently, the spacing members have a limited tie-down effect upon the boxes immediately below the uppermost struts. This enhances the total stability of the load, while the uprights and struts coact to maintain the predetermined transverse positions of the boxes in each tier.

It should also be noted that spacing members 32 are employed in only alternate tiers. This spacing of the members longitudinally of the car in alternately successive tiers minimizes the quantity of materials required and reduces the total cost of the car load.

During unloading operations, the stacks of boxes are moved in the reverse order of loading, by any suitable mechanized off-loading device, such as a hand truck. Since the spacing members 32 are not physically secured to the car or any of the boxes of the car load, unloading can also be done in a minimum of time, thereby reducing total labor costs.

Figure 6:
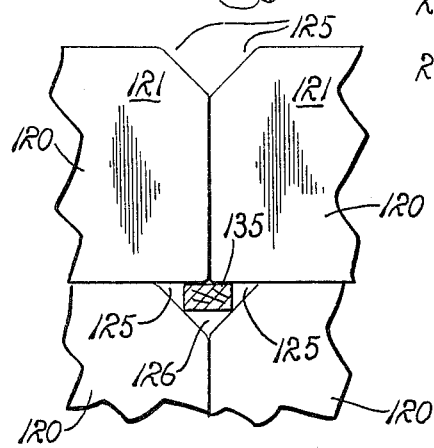
FIG. 6 is a fragmentary view similar to FIG. 5, but showing another form of box with which the present invention is adapted for use.

As can be seen in FIG. 6, the boxes may be of a configuration slightly different from that shown in FIGS. 2 and 5 and still attain the advantages of the present invention. In FIG. 6, a second form of box 120 is illustrated as having opposed ends 121 which affords a spacing interval 125 at each end of the box, but adjacent to only the top thereof. When the boxes are arranged in stacks in the previously described rows and tiers, contiguous boxes form a chamber 126 which is substantially triangular in cross-section. Accordingly, a strut 135 is then provided with a cross-section so as to be accommodated by the chamber 126. As in the form of boxes described in FIGS. 2 and 5, the car load is loaded and unloaded in substantially the same sequence, thereby providing the same dependability of retention of position during shipment and similar economies in loading and unloading.

*Second form*

The walls of box cars frequently are not uniformly planar, due to the development of variations through warping, bulging and the like. Also, the spacing between walls often varies from car to car. To accommodate such variations along the longitudinal extent of a box car, it is desirable to have available a form of spacing member which is adjustable. Such a second form of spacing member 232 is shown in FIGS. 8 and 9.

As with the spacing members 32, the spacing member 232 includes struts 235 having side faces 237 and top faces 238, and elongated uprights 240 having load engaging faces 242, each substantially identical with the corresponding elements of the spacing members 32. One pair of opposed uprights 240A is attached to the struts 235 as described above for the member 32. The second pair of opposed uprights 240B is not attached directly to the struts, but instead is secured thereto by means of auxiliary struts or blocks 244 having outer ends 245.

The pair of uprights 240B are rigidly secured to the blocks 244 as by nails 246, with their load engaging faces 242 preferably flush with the ends 245 of the blocks. The uprights are disposed in sliding contact with the side faces 237 of the struts 235, with the blocks in sliding contact with the top faces 238 of the corresponding struts. The uprights 240B may be secured in rigid perpendicular relation to the struts and the opposite pair of uprights 240A at any desired position along the struts by means of nails 247 or the like.

In preparing a car load, substantially the same procedure is followed as was described above for the rigid spacing members 32, except in the method of insertion of the individual spacing members 232. As above, each spacing member is positioned in its corresponding spacing chamber 250 so that the struts 235 are received in the respective chambers 251 formed by contiguous boxes 252, as shown in FIG. 9. In this position the uprights 240A are disposed with their load engaging faces firmly engaged with the corresponding boxes 252A and the opposite uprights 240B remain slidably adjustable for similar disposition against the boxes 252B. After slidably positioning the uprights 240B in firm engagement against the boxes so as to conform to the local wall spacing, the blocks 244 are secured to the struts by means of the nails 247. In this manner, the same dependability in retention of position of the car load is obtained, regardless of variations in transverse wall spacing either within a single box car or from car to car.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A car load adapted to be disposed within a vehicle having load confining walls comprising a plurality of boxes of a substantially uniform shape, each having opposite ends of substantially identical polygonal configuration and opposite sides interconnecting the ends, the boxes being arranged in vertical stacks and the stacks arranged in end-to-end relation in tiers and in side-by-side relation in rows in substantially filling relation within the walls of the vehicle but affording intervals of spacing at each end of a box adjacent the sides thereof thereby to form hollow chambers when the stacks are disposed substantially in side-by-side relationship, at least two adjacent stacks in each tier being disposed in spaced relationship transversely of the car, and a spacing member interposed said spaced adjacent stacks in a tier, said member having an elongated strut provided with opposite ends adapted individually to be received in said chambers of said adjacent stacks and stop means carried by said strut and adapted to engage the respective ends of the boxes in said adjacent stacks of a tier and prevent endward movement of said boxes toward each other transversely of the car.

2. In a load confining and supporting vehicle having a floor and laterally opposed longitudinally extended side walls interconnected by transversely extended end walls the combination of a car load, comprising a plurality of boxes of substantially uniform shape arranged in stacks of a predetermined number of superposed boxes and the stacks arranged in longitudinally extended rows and transversely extended tiers, the boxes having substantially identical polygonal ends of a predetermined configuration to afford an interval of spacing at each end of a box adjacent the sides thereof and being disposed in end-to-end relation in said tiers thereby to form hollow receiving chambers when the stacks are disposed in side-by-side relation in said rows, at least two adjacent stacks in each tier being spaced at a distance to provide a longitudinally extended spacing passage in the car load, and a plurality of spacing members disposed in said spacing passage at predetermined intervals of spacing longitudinally of the vehicle to prevent transverse shifting of the boxes in each stack, each of said spacing members having a plurality of transversely extending struts provided with opposite ends adapted individually to be received in said chambers of said adjacent stacks, stop means rigidly connected to said struts and disposed in engagement with the ends of the boxes of said adjacent stacks forming said spacing passage to prevent endward movement of said boxes toward each other transversely of the vehicle.

3. A car load adapted to be disposed within a vehicle having load confining walls comprising a plurality of boxes of a substantially uniform shape, each having opposite ends of substantially identical polygonal configuration and opposite sides interconnecting the ends, the boxes being arranged in vertical stacks and the stacks arranged in end-to-end relation in tiers transversely of a car and in side-by-side relation in rows longitudinally thereof in substantially filling relation within the walls of the vehicle but affording intervals of spacing at each end of a box adjacent the sides thereof thereby to form hollow receiving chambers when the stacks are disposed in side-by-side relationship, at least two adjacent stacks in each tier being spaced at a predetermined distance to define a spacing passage extended longitudinally of the car, and a spacing member disposed in the spacing passage defined by said adjacent stacks, said member having a plurality of elongated struts disposed transversely of the car and spaced at predetermined elevational levels in said adjacent stacks, each of said struts being provided with opposite ends respectively received in one of said hollow receiving chambers, and two sets of elongated uprights rigidly secured to said struts and spaced longitudinally thereof in laterally opposed paired relationship, each of said uprights affording an engaging face in contact with the ends of the boxes in a respective stack defining said spacing chamber.

4. The car load of claim 3 wherein a plurality of said spacing members are disposed in said stacks of boxes in alternately successive tiers in the adjacent rows of those stacks defining said spacing passage.

5. The car load of claim 3 wherein said polygonal configuration of the opposite ends of said boxes provides hollow receiving chambers having a substantially rectangular cross-sectional configuration.

6. The car load of claim 3 wherein said polygonal configuration of the opposite ends of said boxes provides hollow receiving chambers having a substantially triangular cross-sectional configuration of sufficient dimensions to receive said opposite ends of said struts.

7. In the load confining and supporting vehicle having a floor and laterally opposed longitudinally extended side walls interconnected by transversely extended end walls the combination of a car load comprising a plurality of boxes of substantially uniform shape arranged in stacks of a predetermined number of superposed boxes and the stacks arranged in said vehicle in longitudinally extended rows and transversely extended tiers, the boxes having substantially identical polygonal ends of a predetermined configuration to afford an interval of spacing at each end of a box adjacent the sides thereof and being disposed in end-to-end relation in said tiers thereby to form hollow receiving chambers when the stacks are disposed in substantially side-by-side relation in said rows, at least two adjacent stacks in each tier being disposed in spaced relationship to provide a longitudinally extended spacing chamber in the car load; and a plurality of spacing members disposed in said spacing chamber at predetermined intervals of spacing longitudinally of the vehicle to prevent transverse shifting of the boxes in each tier, each of said spacing members having a plurality of struts disposed at predetermined elevational levels in said stacks of boxes, each of said struts having opposite ends respectively received in said hollow chambers at said predetermined elevational levels, each strut affording opposite side faces, and a plurality of elongated uprights rigidly secured to the side faces of said struts at selected stations longitudinally of the struts and arranged in laterally opposed pairs, each of said uprights providing an engaging face disposed in contact with the ends of the boxes in a respective stack thereby to prevent endward movement of said boxes in a direction transversely of their respective tiers.

8. In a load confining vehicle having rectangularly related opposite end walls and opposite side walls, a plurality of boxes having rectangularly related opposite polygonal ends and opposite sides and substantially filling said vehicle between the end walls and the side walls, said boxes being arranged in stacks with their corresponding ends and sides in substantially vertical alignment, the stacks being arranged with their boxes in end-to-end alignment in tiers between the side walls of the vehicle and with their boxes in side-to-side alignment between the end walls of the vehicle, said polygonal ends and adjacent sides of the boxes defining substantially horizontal channels therebetween extended between the side walls of the vehicle, substantially rigid struts positioned in said channels and clamped between the adjacent sides of the boxes, and substantially rigid pairs of upright members secured to the struts on opposite sides thereof and interconnecting their respective struts in fixed elevationally spaced relation, the upright members of each pair being positioned between the adjacent ends of the boxes of corresponding stacks of adjacent tiers in clamped relation therebetween.

9. A car load adapted to be disposed within a vehicle having load confining walls comprising a plurality of boxes of a substantially uniform shape, each having opposite ends of substantially identical polygonal configuration and opposite sides interconnecting the ends, the boxes being arranged in vertical stacks and the stacks arranged in end-to-end relation in tiers and in side-by-side relation in rows in substantially filling relation within the walls of the vehicle but affording intervals of spacing at each end of a box adjacent the sides thereof thereby to form hollow chambers when the stacks are disposed substantially in side-by-side relationship, at least two adjacent stacks in each tier being disposed in spaced relationship transversely of the car; and a spacing member interposed said spaced adjacent stacks in a tier, said member having an elongated strut provided with opposite ends individually adapted to be received in said chambers of said adjacent stacks and stop means carried by said strut and adapted to engage the respective ends of the boxes in said adjacent stacks of a tier and prevent endward movement of said boxes toward each other transversely of the car.

10. The car load of claim 9 wherein the stop means of each of said spacing members is adjustable to accommodate varied transverse spacings between said spaced adjacent stacks.

11. In a load confining and supporting vehicle having a floor and laterally opposed longitudinally extended side walls interconnected by transversely extended end walls the combination of a car load comprising a plurality of boxes of substantially uniform shape arranged in stacks of a predetermined number of superposed boxes and the stacks arranged in said vehicle in longitudinally extended rows and transversely extended tiers, the boxes having substantially identical polygonal ends of a predetermined configuration to afford an interval of spacing at each end of a box adjacent the sides thereof and being disposed in end-to-end relation in said tiers thereby to form hollow receiving chambers when the stacks are disposed in substantially side-by-side relation in said rows, at least two adjacent stacks in each tier being disposed in spaced relationship to provide a longitudinally extended spacing chamber in the car load; and a plurality of spacing members disposed in said spacing chamber at predetermined intervals of spacing longitudinally of the vehicle to prevent transverse shifting of the boxes in each tier, each of said spacing members having a plurality of struts disposed at predetermined elevational levels in said stacks of boxes, each of said struts having opposite ends respectively received in said hollow chambers at said predetermined elevational levels, each strut affording opposite side faces, a plurality of elongated uprights, at least one pair of said plurality of uprights being rigidly secured to the respective side faces of said struts in laterally opposed paired relationship, the uprights of at least one such rigidly secured pair each providing an engaging face disposed in contact with the ends of the boxes in a first respective stack, at least one pair of said plurality of uprights being disposed in slidable engagement with the respective side faces of said struts in laterally opposed paired relationship, the uprights of at least one of such slidable pairs each providing an engaging face for contact with the ends of the boxes in a second respective stack transversely oppositely of the spacing chamber from the first respective stack, means connecting the uprights in each slidable pair in said paired relationship, and means rigidly securing said connecting means to the struts with the engaging faces of the slidable uprights disposed in contact with the ends of the box in said second respective stack and thereby cooperating with the engaging faces of said rigidly secured uprights to prevent endward movement of said boxes in a direction transversely of their respective tiers.

12. The car load of claim 11 wherein said means connecting the slidable pair of uprights consists of a plurality of auxiliary struts rigidly secured between the slidable uprights and disposed individually in slidable engagement with the respective spacing member struts.

References Cited by the Examiner

UNITED STATES PATENTS

| 169,303 | 10/1875 | Simons | 217—42 |
| 2,474,949 | 7/1949 | Lewis et al. | 105—369 |
| 2,567,465 | 9/1951 | Barbour | 105—369 |
| 2,657,644 | 11/1953 | Pierce | 105—369 |

ARTHUR L. LA POINT, *Primary Examiner.*

DRAYTON E. HOFFMAN, *Examiner.*